Dec. 23, 1969 R. N. DAVIS ET AL 3,485,078

DEVICE FOR DISSIPATING ELASTIC STRAIN ENERGY

Filed Aug. 7, 1967 2 Sheets-Sheet 1

INVENTORS
ROBERT NELSON DAVIS
ALLAN HOBEN ROBINSON
BY
Robert S. Dunham
ATTORNEY

Dec. 23, 1969    R. N. DAVIS ET AL    3,485,078
DEVICE FOR DISSIPATING ELASTIC STRAIN ENERGY
Filed Aug. 7, 1967                    2 Sheets-Sheet 2
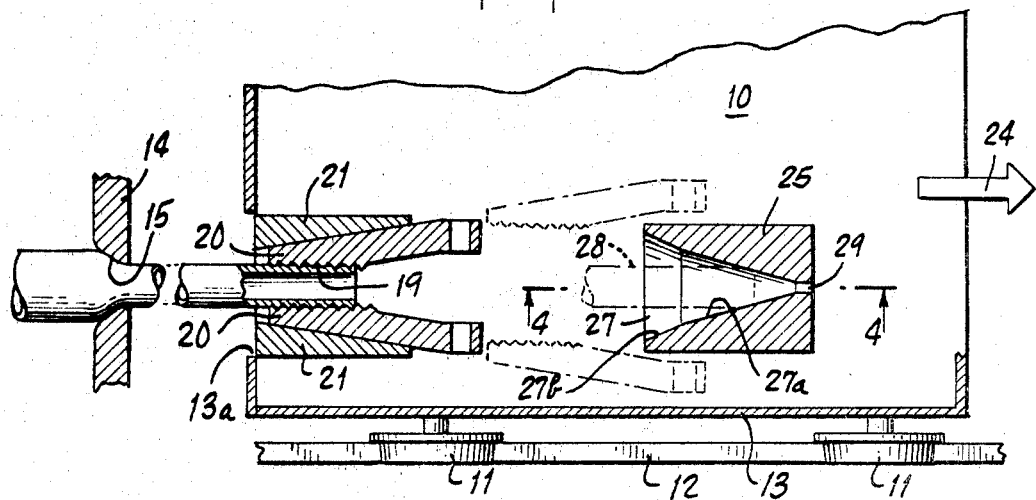
Fig. 3.
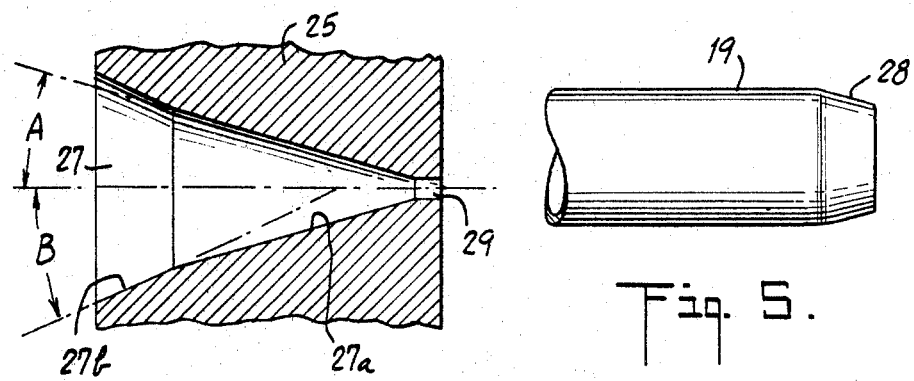
Fig. 4.                 Fig. 5.
INVENTORS
ROBERT NELSON DAVIS
ALLAN HOBEN ROBINSON
BY
Robert S. Dunham
ATTORNEY

United States Patent Office 3,485,078
Patented Dec. 23, 1969

3,485,078
DEVICE FOR DISSIPATING ELASTIC STRAIN ENERGY
Robert Nelson Davis and Allan Hoben Robinson, Kingston, Ontario, Canada, assignors to Alcan Research and Development, Limited, Ottawa, Ontario, Canada
Filed Aug. 7, 1967, Ser. No. 658,924
Int. Cl. B21c 1/14
U.S. Cl. 72—290                                    10 Claims

ABSTRACT OF THE DISCLOSURE

A rigid abutment, mounted on a drawbench carriage for drawing stock such as metal tubes or rods through a die, and having a conical recess positioned to receive the forward end of a drawn length of stock when the stock jumps suddenly forward on the drawbench owing to release of elastic strain energy upon completion of the draw. The recess is so dimensioned that the forward end of the stock is slightly deformed by impact with the conical recess wall, thus dissipating the released energy which might otherwise cause the stock to rebound or bend.

BACKGROUND OF THE INVENTION

In certain types of apparatus for imparting longitudinal strain to an axially elongated element, and especially in apparatus for longitudinally deforming an axially elongated ductile article, release of elastic strain energy causes the workpiece to move suddenly forward upon removal of the longitudinal strain. The present invention relates to devices for dissipating the released elastic strain energy in such apparatus, particularly to prevent the workpiece from being damaged incident to the sudden forward movement. In an important specific aspect, the invention is directed to elastic strain energy dissipating devices in drawbench carriages for drawing metal stock through a die.

Reduction in cross-sectional dimension of axially elongated ductile articles such as metal tubes, rods and the like (herein termed "stock") is commonly effected by drawing the stock through dies. Typically, apparatus for drawing aluminum or other metal stock includes a movable drawbench carriage having jaws adapted to grasp the forward end of a length of stock projecting through a die, so that forward movement of the carriage (i.e., away from the die) draws the stock through the die and thereby subjects it to longitudinal deformation with concomitant reduction in diameter.

The carriage jaws are customarily arranged to permit free forward movement of the workpiece relative to the carriage. When the trailing end of the workpiece passes through and emerges from the die at the conclusion of the drawing step, the consequent abrupt cessation of longitudinal strain on the workpiece releases elastic strain energy which imparts a substantial forwardly-directed force to the workpiece, causing it to jump suddenly forward on the drawbench and to strike the carriage structure forwardly of the jaws.

This forward jumping motion frequently results in damage to the workpiece unless the released elastic strain energy is properly controlled or dissipated. For example, in the case of small-diameter stock (e.g., aluminum tubing less than about one inch in diameter), the impact of the stock against the carriage tends to bend the first four or five feet of the stock into a dog-leg and may also cause the stock to rebound from the carriage. Larger-diameter stock does not usually bend, but tends to rebound from the carriage with considerable force and may strike the die or die plate behind the carriage, thereby distorting the trailing end of the workpiece, in many instances sufficiently to necessitate removal of the distorted end portion before the workpiece can be subjected to further drawing operations.

To prevent or minimize such damage, drawbenches have heretofore been equipped with elaborate shock-absorbing systems, ordinarily including springs or like resilient means for absorbing the released energy. However, these systems require inconvenient adjustment and maintenance in service; in addition, the provision of effective shock-absorbing systems of the types known and used for such purpose becomes increasingly difficult and costly with increasing drawbench length.

SUMMARY OF THE INVENTION

The present invention in a broad sense embraces new and improved means for dissipating elastic strain energy released upon removal of longitudinal strain from an axially elongated element, in apparatus wherein the released energy effects sudden forward movement of the element in a generally axial direction. Stated thus broadly, the invention contemplates the provision of a rigid abutment mounted forwardly of the strain-imparting means of the apparatus and having a conical recess opening toward the strain-imparting means for receiving the forward end of the element upon such forward movement thereof. The recess tapers forwardly from a maximum diameter larger than the diameter of the element forward end to a minimum diameter smaller than the diameter of the element forward end, so that as the element advances into the recess its forward end strikes the conical recess wall. The impact crimps or deforms the element forward end into a tapering, generally conoid shape, and thereby dissipates the elastic strain energy without bending or rebounding of the element.

As incorporated in a metal stock drawbench of the type referred to above, the abutment of the invention is fixedly mounted on the carriage forwardly of the carriage jaws, with the conical recess opening toward the jaws and preferably positioned so as to be axially aligned with a workpiece held in the jaws. This abutment constitutes an energy-dissipating means fully effective to prevent the workpiece from bending or rebounding incident to release of elastic strain energy, even in very long drawbenches, yet it is advantageously simple and economical in construction (especially as compared to the resilient shock-absorbing systems heretofore used for such purpose), and requires essentially no adjustment or maintenance in operation.

Further features and advantages of the invention will be apparent from the detailed description hereinbelow set forth, together with the accompanying drawings.

BRIEF DESCRIPTION OF THE DRAWINGS

FIG. 3 is a simplified fragmentary sectional plan view of the drawbench apparatus of FIG. 1, taken along the line 3—3 of FIG. 1;

FIG. 4 is an elevational sectional view of one energy-dissipating abutment of the invention in the apparatus of FIG. 1, taken along the line 4—4 of FIG. 3; and FIG. 5 is a view of a drawn length of metal stock showing the end deformation produced by impact with the energy-dissipating abutment of FIGS. 1–4.

DETAILED DESCRIPTION

Figure 1:
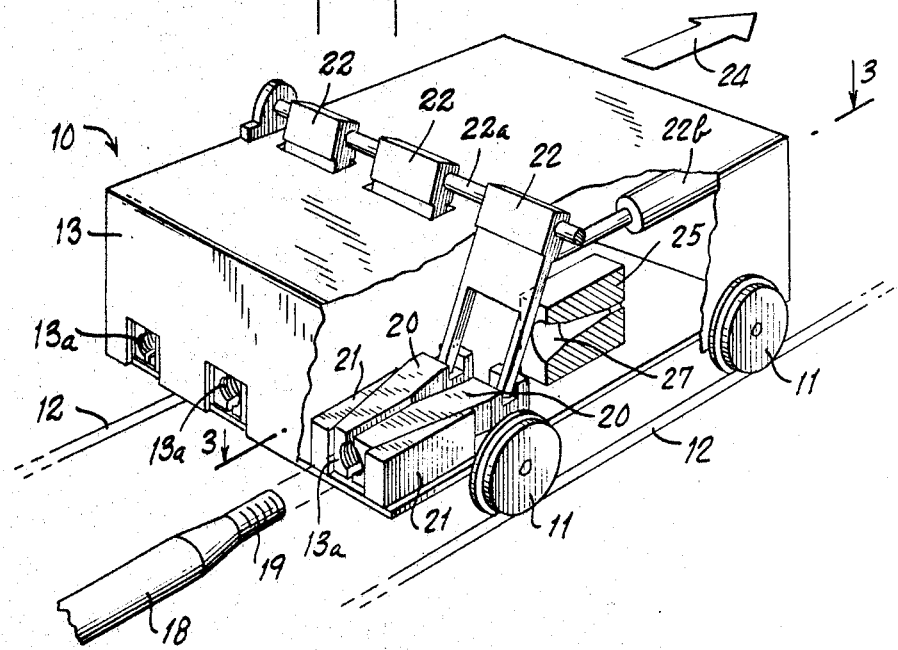
FIG. 1 is a simplified schematic perspective view, partly broken away, of a drawbench incorporating an illustrative embodiment of the invention.

Referring first to FIG. 1, there is shown in simplified and somewhat schematic form a generally conventional type of drawbench apparatus for drawing metal stock, e.g., aluminum tubes, rods and the like. This apparatus comprises a movable carriage 10, having wheels 11 riding on fixed rails 12, and including a rigid superstructure or carriage head 13 which defines one or more throats 13a. The apparatus of FIG. 1 has three throats, arranged in spaced axially parallel relation for simultaneously drawing three tubes through correspondingly spaced axially parallel fixed die apertures. As further shown in FIG. 3, each throat 13a is open in the direction of the fixed die 14 and is aligned with the axis of its associated die aperture 15, rails 12 being positioned to guide the carriage for movement displacing the throat toward and away from the die along this axis. Suitable drive means (not shown) are connected to the carriage for pulling the carriage away from the die on the rails 12 during the drawing operation hereinafter described.

For grasping a workpiece 18 (shown as a length of metal tubing) at its forward end 19, a pair of dentate jaws 20 are provided in each throat 13a, the two jaws being respectively movably positioned (for example) in a pair of jaw guides 21 fixedly supported in the carriage head on opposite sides of the throat. Guides 21 diverge in the direction away from the die, and serve to support the jaws 20 for guided sliding movement along paths extending forwardly (i.e., in the direction in which the workpiece is drawn) from the carriage head throat 13a in diverging relation. The teeth of the jaws face each other across the throat in position to engage opposite side surface portions of a workpiece forward end 19 projecting through the die aperture 15 in axial alignment therewith. The spacing between the jaws may be increased or decreased, to accommodate workpieces of larger or smaller diameter, by moving the jaws forwardly or rearwardly along their forwardly diverging paths.

To move the jaws rearwardly into position tightly grasping the forward end of a workpiece, each pair of jaws may be engaged (adjacent its forward end) by an actuating fork 22 depending from and pivoted on a shaft 22a which extends across the carriage, transversely of the direction of carriage travel. Each fork is adapted to swing forwardly and rearwardly in correspondence with forward and rearward movement of its associated jaws. Further, each fork is provided with means such as a fluid-operated cylinder 22b for effecting forcible rearward movement of the fork to drive the jaws into closed rearward position gripping a workpiece forward end.

In use of this apparatus to effect reduction in diameter of a metal tube as shown in FIGS. 1 and 3, the forward end of the tube (which initially has a diameter larger than that of die aperture 15) is first swaged for insertion through the die aperture. The carriage is positioned in proximate relation to the die 14 so that the swaged tube end 19, projecting forwardly beyond the aperture 15, extends into the carriage head throat 13a; and the jaws 20 are brought into engagement with this tube end by means of fork 22 driven by cylinder 22b.

The carriage is then pulled forwardly on the rails 12, away from the die (in the direction indicated by arrow 24), by the aforementioned drive means. The longitudinal tension thereby exerted on the tube 18 between the carriage jaws and the die tends to draw the jaws rearwardly in the converging throat 13a and thus to bring them together, enhancing their grip on the tube end 19. As the carriage continues to move forwardly, it draws the tube 18 progressively through the die aperture 15, effecting longitudinal deformation and concomitant reduction in diameter of the tube. An internal mandrel is sometimes positioned within the tube in the die; in such case, the drawing operation also effects reduction in thickness of the tube wall.

When the rearward or trailing end of the tube emerges from the aperture 15 at the conclusion of the drawing step, the longitudinal strain previously exerted on the tube is abruptly removed, releasing elastic strain energy which imparts a considerable forward force to the tube in an axial direction. This force effects sudden forward movement of the tube and jaws relative to the carriage head 13; since the space between the jaws increases as they slide forwardly in their diverging paths to the positions represented by broken lines 23 in FIG. 3, they release the tube end 19, which continues to move freely forward through the carriage head throat.

As stated, three tubes may simultaneously be drawn by the carriage of FIG. 1, the foregoing operations being performed concurrently on each of the three tubes.

As incorporated in the above-described apparatus, the device of the present invention in its illustrated embodiment comprises a rigid, solid abutment 25, fixedly mounted on the carriage 10 forwardly of the jaws 20 (in the path of advance of the workpiece) in the throat 13a; three such abutments are provided in the carriage of FIG. 1, i.e., one for each throat. Each abutment 25 has a conical recess 27 opening toward the jaws in position to receive the forward workpiece end 19 when the workpiece jumps forwardly upon release from the die 14. Specifically, the recess 27 is so disposed as to be in coaxial alignment with a tube or like workpiece held in the jaws 20.

Recess 27 tapers forwardly (i.e., again, in the direction of advance of the workpiece), from a maximum diameter larger than the diameter of the largest workpiece that can be drawn by the carriage to a minimum diameter smaller than the diameter of the smallest workpiece that can be drawn by the carriage; in other words, the range of diameters through which the recess tapers corresponds to the range of diameters of workpieces that can be accommodated between the jaws 20 in the throat 13a. Consequently, regardless of workpiece diameter, when the forward end of any workpiece held by the carriage jaws moves forwardly into the recess 27 at the conclusion of a draw, such workpiece end will strike a tapering or conical portion of the recess wall.

Figure 2:
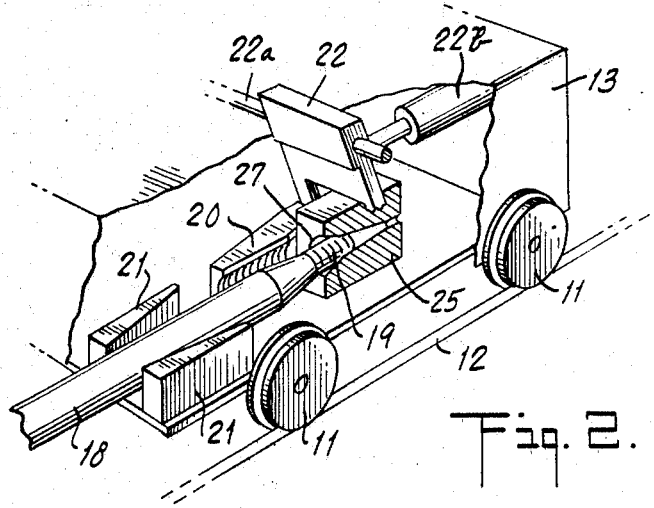
FIG. 2 is a fragmentary perspective view of the drawbench of FIG. 1, showing the position of the drawbench jaws and workpiece at the conclusion of the drawing operation.

The function of the described device may now be readily understood. As already explained, upon release of elastic strain energy incident to the emergence of the trailing end of a workpiece 18 from the die aperture 15, the workpiece is freed by the jaws 20 and jumps suddenly forward; this forward motion drives the forward end 19 of the workpiece with considerable force against the conical wall of recess 27, as shown in FIG. 2 and indicated by broken line 28 in FIG. 3. Owing to the axial alignment of the recess and workpiece, ordinarily the entire periphery of the workpiece end 19 strikes the recess wall; thus the locus of the impact is an annular region of the tapering wall surface and is in a plane generally perpendicular to the axis of the recess.

The force of the impact against the recess wall deforms the workpiece end 19 into a more or less conoid tapering shape, shown at 28a in FIG. 5. Such deformation effectively dissipates the released elastic strain energy, with the result that instead of bending or rebounding forcefully from the carriage, the workpiece merely drops out of the throat 13a and may at once be subjected to further drawing operations. Indeed, the tapering shape imparted to the workpiece end 19 facilitates passage of this end through die apertures and carriage jaws in subsequent drawing operations. Also, the tubes fall from the carriage 10 in orderly fashion, facilitating alignment of their open ends for subsequent drawing operations.

The abutment 25 should be fabricated of a suitably hard material (i.e., a material harder that that of the workpiece) to effect the desired deformation of the workpiece end without deformation of the recess wall. For example, in apparatus for drawing aluminum tubes or rods, a suitable material for the abutment is hardened tool steel.

As particularly shown in FIG. 4, a first portion 27a of recess 27, extending from the vertex of the recess to an intermediate locality therein, has walls tapering at a first angle A to the axis of the recess, while the remainder or second portion 27b of the recess (extending from the aforementioned intermediate locality to the mouth of the recess) has walls tapering at a second and larger angle B to the vertex. The axial dimensions of these two recess portions—and hence the recess diameter at the intermediate locality at which the portions meet—are so selected that recess portion 27a will receive the ends of all small-diameter workpieces which tend to bend or "dog-leg" if released elastic strain energy is not properly dissipated, while recess portion 27b will receive the ends of larger-diameter workpieces which do not tend to bend but do rebound if the released energy is not dissipated.

The optimum magnitude of angles A and B is to some extent dependent on the properties, and in particular the hardness, of the metal constituting the workpiece to be drawn; stated generally, the softer the material, the larger should be the angle of the recess wall. The preferred value of these angles is also related to the diameter of the workpiece. For example, in an abutment intended for use in the drawing of aluminum alloy stock having a typical range of hardness, the conical recess wall engaged by a small-diameter workpiece end as defined above preferably tapers at an angle corresponding to a cone included angle of about 30°; if the cone included angle of the recess is smaller than about 30°, the workpiece may become wedged in the recess instead of dropping freely from the carriage as desired. In this example, for larger-diameter workpieces as defined above, it is preferred that the taper of the recess walls correspond to a cone included angle of between about 40° and about 45°. The angles of taper in the small and larger diameter portions 27a and 27b of the recess 27 are selected so that the recess wall portions engaged by small- and larger-diameter workpieces respectively define these preferred cone included angles; thus in FIG. 4 angle A is preferably about 15° and angle B is preferably between about 20° and about 22½°. For use in drawing such aluminum tube, the axial dimensions of the two recess portions and the diameter of the recess at the line of discontinuity between them are preferably so selected that workpieces smaller than about one inch in diameter are received in recess portion 27a while workpieces of larger diameter engage the wall of portion 27b.

As further shown in FIGS. 3 and 4, an opening 29 may be drilled between the vertex of recess 27 and the external forward wall of the abutment, to provide a passage for release of air and foreign material from the recess. This opening should be smaller in diameter than the smallest workpiece to be drawn by the carriage; for example, it may have a diameter of between about ⅛ inch and about ¼ inch.

In one specific example of operation, apparatus as illustrated in FIGS. 1–4 was employed in drawing 60-foot lengths of aluminum ("Alcan" 1S alloy) tube, having a thickness of 0.028 inch and a diameter of 0.850 inch (with a swaged tube forward end diameter of ¾ inch), at a rate of 250 feet per minute. Without exception, at the completion of draw the tubes fell from the carriage in an orderly manner and without bending or rebound from the carriage.

It is to be understood that the invention is not limited to the features and embodiments hereinabove specifically set forth, but may be carried out in other ways without departure from its spirit.

We claim:
1. A device for dissipating elastic strain energy, in combination with
   (a) means for imparting longitudinal elastic strain to an axially elongated element, said means being adapted to effect sudden release of the strained element producing free forward axial movement of said element;
wherein the improvement comprises:
   (b) a rigid abutment disposed forwardly of said strain-imparting means and having a conical recess opening toward said strain-imparting means in position to receive the forward end of said element upon forward axial movement of said element as aforesaid, said recess tapering forwardly from a maximum diameter larger than the diameter of said element forward end to a minimum diameter smaller than the diameter of said element forward end, so that upon forward movement of said element forward end into said recess said forward end engages and is deformed by the conical wall of said recess thereby dissipating elastic strain energy.

2. In apparatus for longitudinally deforming an axially elongated ductile article, including
   (a) means for imparting longitudinal elastic strain to said article, said means being adapted to effect sudden release of the strained article producing free forward axial movement of said article;
a device for dissipating elastic strain energy, wherein the improvement comprises:
   (b) a rigid abutment mounted forwardly of said strain-imparting means and having a conical recess opening toward said strain-imparting means in position to receive the forward end of said article upon forward axial movement of said article as aforesaid, said recess being disposed to be coaxially aligned with said article when strain is imparted to said article by said strain-imparting means, and tapering forwardly from a maximum diameter larger than the diameter of said article forward end to a minimum diameter smaller than the diameter of said article forward end, so that upon forward movement of said article forward end into said recess said forward end engages and is deformed by the conical wall of said recess thereby dissipating elastic strain energy.

3. Apparatus for drawing stock through a die, including
   (a) a carriage movable toward and away from the die; and
   (b) means mounted on said carriage for engaging the forward end of a length of stock extending through said die to draw said length of stock through said die upon movement of said carriage away from said die, said engaging means being adapted to permit free forward axial movement of said length of stock relative to said carriage upon release of said length of stock from said die;
wherein the improvement comprises:
   (c) a rigid abutment fixedly mounted on said carriage forwardly of said engaging means and having a conical recess opening toward said engaging means in position to receive the forward end of said length of stock upon forward axial movement of said length of stock as aforesaid, said conical recess tapering forwardly from a maximum diameter larger than the diameter of said forward end to a minimum diameter smaller than the diameter of said forward end, so that upon forward movement of said forward end into said recess said forward end engages and is deformed by the conical wall of said recess thereby dissipating elastic strain energy.

4. Apparatus as defined in claim 3, wherein the improvement further comprises said abutment having an opening smaller in diameter than said forward end and extending from a forward locality in said conical recess through an external wall of said abutment.

5. Apparatus as defined in claim 3, wherein the improvement further comprises said conical recess being oriented for axial alignment with a length of stock engaged by said engaging means.

6. Apparatus as defined in claim 5, wherein the improvement further comprises said conical recess tapering from the maximum diameter of said recess to an intermediate diameter of said recess at a first cone included angle of predetermined magnitude, and said conical recess tapering forwardly from said intermediate diameter at a second cone included angle of predetermined magnitude different from the magnitude of said first cone included angle.

7. Apparatus as defined in claim 6, wherein said second cone-included angle is smaller than said first cone-included angle.

8. Apparatus as defined in claim 7, wherein said first cone-included angle is between about 40° and about 45° and said second cone-included angle is about 30°.

9. Apparatus as defined in claim 5, wherein said engaging means is adapted to engage stock having a diameter within a given range, and wherein the improvement further comprises said maximum diameter and minimum diameter of said recess being respectively larger and smaller than said given range.

10. A method of drawing an elongated article of aluminum, including the steps of
 (a) inserting the forward end of said article through a die;
 (b) grasping the forward end of said article and advancing said forward end axially forward to draw said article longitudinally through said die, thereby to effect longitudinal deformation and concomitant reduction in diameter of said article; and
 (c) releasing the forward end of said article upon emergence of the trailing end of said article from said die to permit free forward movement of said article in response to release of elastic strain energy;
wherein the improvement comprises:
 (d) interposing a hard conical concave surface in the path of the article in axial alignment therewith, for receiving the forward end of the article to arrest the free forward movement thereof while deforming said forward end.

References Cited
UNITED STATES PATENTS

| | | | |
|---|---|---|---|
| 2,873,849 | 2/1959 | Lombard | 72—290 |
| 3,252,314 | 5/1966 | Winnial | 72—290 |

CHARLES W. LANHAM, Primary Examiner

L. A. LARSON, Assistant Examiner